United States Patent
Takasawa et al.

(10) Patent No.: US 12,053,952 B2
(45) Date of Patent: *Aug. 6, 2024

(54) COATED ALUMINUM MATERIAL FOR JOINING AND ALUMINUM RESIN COMPOSITE MATERIAL

(71) Applicant: NIPPON LIGHT METAL COMPANY, LTD., Tokyo (JP)

(72) Inventors: Reiko Takasawa, Shizuoka (JP); Masanori Endo, Shizuoka (JP); Yusuke Nishikori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 16/610,954

(22) PCT Filed: May 1, 2018

(86) PCT No.: PCT/JP2018/017460
§ 371 (c)(1),
(2) Date: Nov. 5, 2019

(87) PCT Pub. No.: WO2018/207685
PCT Pub. Date: Nov. 15, 2018

(65) Prior Publication Data
US 2020/0061973 A1 Feb. 27, 2020

(30) Foreign Application Priority Data
May 8, 2017 (JP) .................. 2017-092279

(51) Int. Cl.
*B32B 15/08* (2006.01)
*B05D 1/28* (2006.01)
(Continued)

(52) U.S. Cl.
CPC ............ *B32B 15/08* (2013.01); *B05D 1/28* (2013.01); *B05D 3/0254* (2013.01); *B05D 7/14* (2013.01);
(Continued)

(58) Field of Classification Search
CPC ..... B32B 15/08; B32B 15/20; B32B 2255/26; B32B 2264/1021; B32B 2255/28;
(Continued)

(56) References Cited

U.S. PATENT DOCUMENTS

2005/0282945 A1 12/2005 Faris
2013/0157076 A1 6/2013 Matsuno et al.
(Continued)

FOREIGN PATENT DOCUMENTS

CN 102652059 A 8/2012
CN 105189816 A 12/2015
(Continued)

OTHER PUBLICATIONS

Machine translation of WO 01-07680, retrieved Aug. 24, 2021.*
(Continued)

*Primary Examiner* — Michael B Nelson
(74) *Attorney, Agent, or Firm* — RANKIN, HILL & CLARK LLP

(57) ABSTRACT

Provided is a coated aluminum material for joining having an adhesion layer on a surface, and can exert excellent adhesion strength and corrosion resistance performance even under severe use conditions while being chromium-free. Provided is a coated aluminum material capable of producing the coated aluminum material for joining, and an aluminum resin composite material using the coated aluminum material for joining. Disclosed are a coated aluminum material for joining having an adhesion layer on a surface thereof and including a coated aluminum material and a (Continued)

silica-containing film formed on a surface of the aluminum material, the silica-containing film including 0.5 to 35 mass % of a silane coupling agent and having Si and P contents of 2 to 60, and 0.1 to 6.0 mg/m², respectively, and P/Si mass ratio of P content and Si content of 0.02 to 0.15, and a coated aluminum material capable of producing the coated aluminum material for joining, and an aluminum resin composite material obtained using the coated aluminum material for joining.

14 Claims, 1 Drawing Sheet

(51) Int. Cl.
| | | |
|---|---|---|
| *B05D 3/02* | (2006.01) | |
| *B05D 7/14* | (2006.01) | |
| *B29C 45/14* | (2006.01) | |
| *B32B 15/20* | (2006.01) | |
| *B29K 705/02* | (2006.01) | |

(52) U.S. Cl.
CPC ............. *B29C 45/14* (2013.01); *B32B 15/20* (2013.01); *B29K 2705/02* (2013.01); *B32B 2255/06* (2013.01); *B32B 2255/20* (2013.01); *B32B 2255/26* (2013.01); *B32B 2255/28* (2013.01); *B32B 2264/1021* (2020.08)

(58) Field of Classification Search
CPC ... B32B 2255/06; B32B 2255/20; B05D 1/28; B05D 3/0254; B05D 7/14; B05D 2202/25; B05D 2518/10; B29C 45/14; B29K 2705/02; C09J 2483/003; C09J 2400/163; C09J 2400/166; C09J 2423/00; C09J 5/02; C23C 22/74; C23C 22/66; C23C 22/03; C23C 2222/20
See application file for complete search history.

(56) References Cited

U.S. PATENT DOCUMENTS

| | | | |
|---|---|---|---|
| 2013/0264741 A1 | | 10/2013 | Ookura et al. |
| 2015/0217545 A1* | | 8/2015 | Endo .................. B29C 65/8215 |
| | | | 156/151 |
| 2016/0068687 A1 | | 3/2016 | Nakamura et al. |
| 2016/0243794 A1 | | 8/2016 | Hirano et al. |
| 2020/0157687 A1 | | 5/2020 | Takasawa et al. |

FOREIGN PATENT DOCUMENTS

| | | | |
|---|---|---|---|
| EP | 1643009 A1 | | 4/2006 |
| JP | S58-177473 | * | 12/1983 |
| JP | 2000-319787 A | | 11/2000 |
| JP | 2001-225352 A | | 8/2001 |
| JP | 2005-200757 A | | 7/2005 |
| JP | 2008-050692 A | | 3/2008 |
| JP | 2008-050693 A | | 3/2008 |
| JP | 2008-050692 | * | 12/2008 |
| JP | 5125284 B2 | | 1/2013 |
| JP | 5125285 B2 | | 1/2013 |
| JP | 2014-034201 A | | 2/2014 |
| WO | 01/07679 A1 | | 2/2001 |
| WO | WO 01-07680 | * | 12/2001 |

OTHER PUBLICATIONS

Machine translation of JP S58-177473, retrieved Feb. 26, 2022.*
Machine translation of JP 2008-050692 retrieved Jan. 27, 2023.*
Chinese Office Action (CN OA) dated Jan. 16, 2020 issued in the corresponding Chinese Patent Application No. 201880025054.X.
International Search Report dated Jul. 17, 2018 filed in PCT/JP2018/017460.
PCT International Preliminary Report on Patentability dated Nov. 12, 2019 filed in PCT/JP2018/017460, total 6 pages.
Extended European Search Report (EESR) dated Jan. 29, 2021 issued in the corresponding European Patent Application No. 18799325.8.

* cited by examiner

[Fig.1]
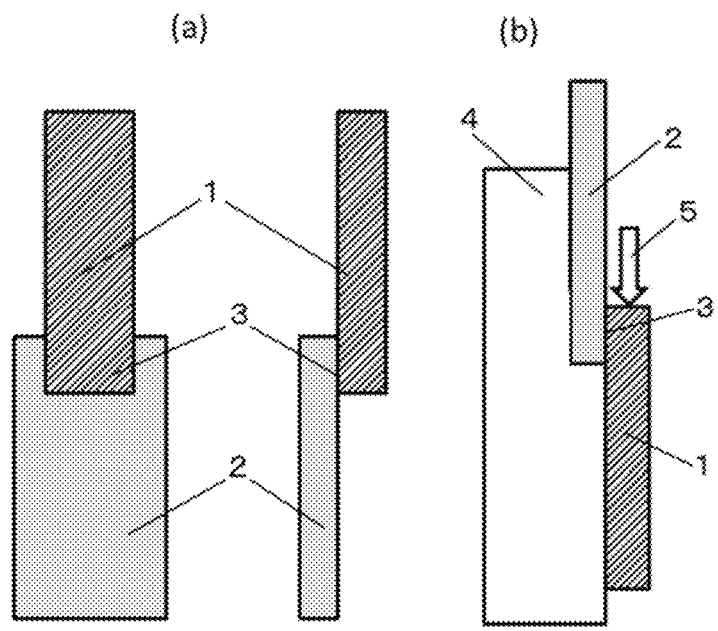
[Fig.2]
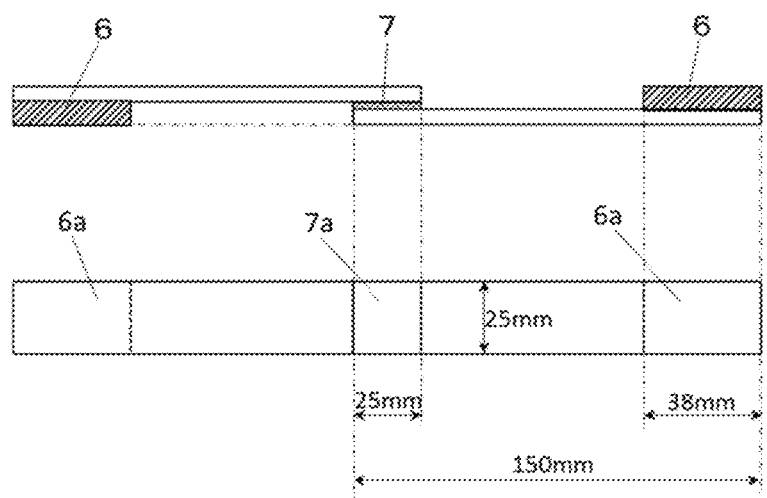

COATED ALUMINUM MATERIAL FOR JOINING AND ALUMINUM RESIN COMPOSITE MATERIAL

TECHNICAL FIELD

This invention relates to a coated aluminum material having a silica-containing film as a joining undercoat film, and a coated aluminum material for joining including an adhesion layer provided on the silica-containing film, and further, an aluminum resin composite material including a resin molded body joined thereto with the joining undercoat film or the adhesion layer provided thereunder, and relates to a coated aluminum material for joining which is not only excellent in adhesion strength of aluminum/resin junction surface, but also excellent in corrosion resistance, and can be preferably used in a wide variety of many fields including components, casings, heat insulating panels, and the like for automobiles, for transport equipment, for home electrical appliance products, for industrial equipment, and the like, although not particularly limited thereto, and an aluminum/resin composite material obtained by using the coated aluminum material for joining.

BACKGROUND ART

In a wide variety of fields of components and the like of automobiles, transport equipment, home electrical appliance products, home electrical appliances, industrial equipment, and the like, a variety of many aluminum components have been used. Such an aluminum component is often joined with a resin component which is lightweight and low-priced, and has high insulating property, heat insulating properties, rigidity, and the like entirely or partially on a surface before or after machining such as press working, and is used as an aluminum resin composite material. Then, for dissimilar material joining between the aluminum components and the resin components, an adhesive is generally used, or methods such as screwing and fitting are adopted. Particularly, in uses such as automobile and transport equipment, the components are often used under severe environment exposed to temperature, humidity, dust, or acid rain resulting from sulfur dioxide, nitrogen oxide, or the like, corrosive substances such as sea salt particles coming flying from the sea along the coast, or the like, or other substances. For the casing components, sensor components, cooling components, switching components, capacitor components, battery components, heat insulating panels, and the like to be used in these uses, it becomes an important problem how to achieve the improvement of the corrosion resistance, the airtightness, and the like under such severe environment.

As the joining technique of a metal and a resin, a method using an adhesive has been conventionally known as a general technique. However, in recent years, from the viewpoints of the working efficiency, the reduction of the number of components, the simplification of the product shape, the durability, and the like, a method of so-called insert molding of injecting a molten resin into an injection molding mold including a metallic component set therein and molding a resin component, to thereby fixedly attaching the resin component to the metallic component, or other methods have been proposed as industrially more preferable joining methods. Then, in order to perform joining between the metallic component and the resin component at a lower cost, and to more improve the adhesive strength therebetween, some proposals have been provided regarding the method for performing a prescribed surface treatment on a surface of the metallic component to be joined with the resin component.

For example, PTL 1 proposes a surface treated metal sheet in which, on a surface of a metal substrate, a chemical conversion film including a colloidal silica and a thermosetting resin are stacked, and an adhesive layer is stacked further thereon, and further proposes a metal sheet composite resin molded product obtained by making a composite of the surface-treated metal sheet and the resin molded product.

Further, PTL 2 proposes an insert molding lamination adhesion film obtained by stacking an adhesion film having adhesion, the adhesion film containing a modified polyolefin type resin, which is prepared by introducing a polar group into a polyolefin type resin, and a thermoplastic resin film not having adhesion. According to PTL 2, the insert molding lamination adhesion film is used for setting a metallic member in a mold and injection molding a thermoplastic resin, and favorably bonds the metallic member and the injection-molded resin member, resulting in a high heat resistance.

Further, PTL 3 proposes a metallic member-propylene resin foam member composite body obtained by subjecting the surface of a metallic member such as a member made of aluminum or a member made of an aluminum alloy to a surface treatment such as anodic oxidation treatment, and subjecting a propylene resin to insert foaming molding in a molten foamed state using the resulting surface-treated metallic member, and integrating the metallic member and the propylene resin foam member. According to PTL 3, the composite body is excellent in sealing property and joining property, and also contributes to the reduction of the weight.

Still further, PTL 4 proposes a method for manufacturing a metal insert resin composite molded product by setting a metallic component with the surface previously chemically etched in a mold, and then, performing injection molding using a thermoplastic resin material. According to PTL 4, the metal insert resin composite molded product can ensure the airtightness even in changes in severe environment.

Furthermore, the present inventors have proposed a coated aluminum material in which a coating film is formed on a surface of an aluminum material with an inorganic film (silica-containing film) containing silicon oxide within the range of a silicon amount of 5 to 200 mg/m$^2$ and a silicon content of 25 to 46.7 mass % and containing a phosphorus compound within the range of a phosphorus amount of 0.1 to 20 mg/m$^2$ and a phosphorus content of 0.2 to 10 mass % provided therebetween (PTL 5), and further proposed a coated aluminum material in which a coating film is formed on a surface of an aluminum material with an inorganic film (silica-containing film) containing a silicon compound within the range of a silicon amount of 5 to 200 mg/m$^2$ and a silicon content of 30 to 46.7 mass %, and containing a phosphorus compound within the range of a phosphorus amount of 0.1 to 20 mg/m$^2$ and a phosphorus content of 0.2 to 10 mass %, and containing an organic binder within the range of 35 mass % or less provided therebetween (PTL 6). Then, the coated aluminum material are so-called "chromium-free" substantially not containing hexavalent and trivalent chromiums at all, and are environmentally friendly, and are further excellent in corrosion resistance, and have been used in a large number of fields including automobile industry requiring a coated aluminum material excellent in corrosion resistance, and the like.

CITATION LIST

Patent Literature (PTL)

[PTL 1] Japanese Patent Application Publication No. 2015-110,318
[PTL 2] Republished International Patent Publication No. WO 2012/060311
[PTL 3] Japanese Patent Application Publication No. 2014-034,201
[PTL 4] Japanese Patent Application Publication No. 2001-225,352
[PTL 5] Japanese Patent No. 5,125,284
[PTL 6] Japanese Patent No. 5,125,285

SUMMARY OF INVENTION

Technical Problem

However, with the methods described in PTL 1 to 4, in any case, the adhesion strength at the metal-resin interface when the material is exposed under severe environment is not necessarily sufficient. Namely, in PTL 1, when the metal sheet is a steel sheet, favorable adhesion strength and corrosion resistance are exhibited. However, when the metal sheet is aluminum, the adhesion strength is not sufficient, and there is room for improvement in water-resistant adhesion, in particular. Further, in PTL 2 and 4, for PTL 4, although the surface is roughened by chemical etching, the surface is basically a metallic base metal itself in any case, and the corrosion resistance is not enough; further, for PTL 3, as the surface treatments to be applied to the surface of the metallic member, there are shown physical treatments such as sandblast treatment, liquid honing treatment, and laser processing treatment, and chemical treatments such as anodic oxidation treatment method, and methods using an aqueous solution of an acid or an alkali. However, merely with only the physical treatments and chemical treatments, it is difficult to impart sufficient junction strength and corrosion resistance between a metallic member (aluminum, in particular) and a resin molded body. Further, with the method described in PTL 2 to 4, attachment of an adhesion film to a metallic member, physical treatments and/or chemical treatments on the metallic member surface, or the treatment on the metal surface such as chemical etching on the metallic component surface is performed after removing a processing oil such as a press oil after performing molding processing such as press working. Accordingly, it is difficult to previously perform the treatments before molding processing and as a result, applicability may be undesirably restricted and may result in poor multiplicity of use.

For example, in the fields of construction materials, transportation, electrical machinery, electrons, and the like, an aluminum material including aluminum or an aluminum alloy has been often used, and, in particular, is often used outdoors depending upon the intended use thereof. Accordingly, various products manufactured using a coated aluminum material may be used under still severer environment than in the cases of other fields. Further, in the fields of electrical machinery, electrons, transportation, and the like, a coated aluminum material having a coating film with a film thickness as large as 30 µm or more, and further 40 µm or more in total is sometimes demanded, and such a coated aluminum material can be obtained in the following manner: processing such as pressing is performed to the coated aluminum material; further, after the processing, the surface was subjected to coating such as post coating. Furthermore, a condition wherein a coating film with a film thickness as relatively large as 5 µm or more, and further 10 µm or more even when the film thickness is less than 30 µm is used, and a condition where the coating film is used under the severe wet environment as described above may be combinedly imposed.

Then, in the case of such use under severe wet environment, or when there is a demand for a coating film with a large film thickness as large as 30 µm or more alone or in total, or further when a condition where a coating film with a relatively large film thickness is used and a condition where the coating film is used under severe wet environment are combinedly imposed (these may be hereinafter referred to as "under severe use conditions"), the adhesion between the aluminum material and the coating film may be reduced. Thus, a still more excellent corrosion resistance performance is demanded. Alternatively, when the aluminum material has a coated surface on a surface thereof except for the portion in which the aluminum material and the resin molded body have been made composite, as with the case of use under severe use environment, there may be a demand for more excellent adhesion strength and corrosion resistance performance between the aluminum material and the coating film.

Thus, there is a demand for the development of an aluminum resin composite material which can be joined with a resin with ease even before molding processing or even after molding processing, and is not only excellent in adhesion strength at the aluminum/resin junction surface, but also excellent in corrosion resistance and water resistance, and further excellent in tensile strength of the aluminum/resin junction surface after a corrosion resistance test also at the portion of the aluminum material other than the portion in which the aluminum material and the resin molded body have been made composite, and further can exert excellent adhesion strength and corrosion resistance performance even under the severe use conditions.

Under such circumstances, the present inventors have conducted a close study in order to further improve the coated aluminum materials in PTL 5 and 6, and to develop a coated aluminum material for joining and an aluminum resin composite material capable of exhibiting a high adhesion strength between the resin molded body and itself and a high corrosion resistance of the coated aluminum material in a balanced manner even under severe use conditions when joined with the resin molded body for preparing an aluminum resin composite material. As a result, the present inventors unexpectedly found the following: when a silica-containing film containing a water dispersible silica and a phosphorus compound is formed on a surface of the aluminum material as a joining undercoat film, not only the content or content ratio of silicon (Si) or phosphorus (P) is controlled, but also a silane coupling agent is allowed to be present at a prescribed ratio, and the P/Si mass ratio of the P content to the Si content is controlled within a given specific range; as a result, the aluminum resin composite material exerts excellent adhesion strength and corrosion resistance performance even under severe use conditions while being chromium-free. This led to the completion of the present invention.

Therefore, it is an object of the present invention to provide a coated aluminum material for joining having an aluminum material including aluminum or an aluminum alloy, and an adhesion layer on a surface thereof, and capable of exerting excellent adhesion strength and corrosion resistance performance even under severe use conditions while being chromium-free.

Further, it is another object of the present invention to provide a coated aluminum material capable of producing such a coated aluminum material for joining.

Still further, it is a still other object of the present invention to provide an aluminum resin composite material produced using the coated aluminum material for joining, and capable of exerting excellent adhesion strength and corrosion resistance performance at the junction part between the aluminum material and the resin molded body even under severe use conditions.

Solution to Problem

Namely, the present invention is a coated aluminum material characterized by including an aluminum material including aluminum or an aluminum alloy, and a silica-containing film, as a joining undercoat film, formed on a surface of the aluminum material, the silica-containing film containing a water dispersible silica, phosphoric acid, and a silane coupling agent. The silica-containing film includes the silane coupling agent in a ratio of 0.5 to 35 mass %, and has a Si content falling within the range of 2 to 60 mg/m$^2$, a P content falling within the range of 0.1 to 6.0 mg/m$^2$, and a mass ratio (P/Si mass ratio) of the P content to the Si content falling within the range of 0.02 to 0.15.

Further, the present invention is a coated aluminum material for joining characterized by including an aluminum material including aluminum or an aluminum alloy, and an adhesion layer formed on a surface of the aluminum material with a silica-containing film including a water dispersible silica, phosphoric acid, and a silane coupling agent provided therebetween.

The silica-containing film includes the silane coupling agent in a ratio of 0.5 to 35 mass %, and has a Si content falling within the range of 2 to 60 mg/m2, a P content falling within the range of 0.1 to 6.0 mg/m2, and a mass ratio (P/Si mass ratio) of the P content to the Si content falling within the range of 0.02 to 0.15.

Further, the present invention is an aluminum resin composite material characterized in that a resin molded body is joined to the joining undercoat film of the coated aluminum material, or the adhesion layer of the coated aluminum material for joining.

Note that, in the present invention, the adhesion layer and a coating film layer described later to be stacked on a surface of the aluminum material with a silica-containing film provided therebetween are each formed of a coating film formed by coating. Each film thickness thereof is simply referred to as "film thickness". Further, the film thickness of the sum of the film thickness of the adhesion layer, and the film thickness of the coating film layer stacked on a surface of the aluminum material may be referred to as "total film thickness".

In the present invention, as aluminum materials, mention may be made of rolled material, extruded material, die-cast material, cast material, and the like, including aluminum or an aluminum alloy, processed materials obtained by appropriately processing these, combined materials resulting from appropriate combinations of the materials, and the like.

Further, in the present invention, for the silica-containing film formed on a surface of the aluminum material as a joining undercoat film, or to be formed before the adhesion layer, it is necessary that, the silicon content (Si content) falls within the range of 2 mg/m$^2$ or more and 60 mg/m$^2$ or less, preferably 2 mg/m$^2$ or more and 45 mg/m$^2$ or less, and more preferably 4 mg/m$^2$ or more and 40 mg/m$^2$ or less, and the phosphorus content (P content) falls within the range of 0.1 mg/m$^2$ or more and 6.0 mg/m$^2$ or less, preferably 0.3 mg/m$^2$ or more and 5 mg/m$^2$ or less, and more preferably 0.3 mg/m$^2$ or more and 3.0 mg/m$^2$ or less, and the P/Si mass ratio of the P content to the Si content falls within the range of 0.02 or more and 0.15 or less, preferably 0.02 or more and 0.13 or less, and more preferably 0.04 or more 0.13 or less. Further, it is desirable that the content of the silane coupling agent is 0.5 mass % or more and 35 mass % or less, preferably 1 mass % or more and 25 mass % or less, and more preferably 4 mass % or more and 21 mass % or less. In the present invention, unless these four conditions are satisfied at the same time, the corrosion resistance in the use under severe use conditions is reduced, and the adhesion between the aluminum material and the resin or the coating film is reduced. Accordingly, the durability of the aluminum/resin composite material is impaired.

Then, as for the film thickness of the silica-containing film, it is generally desirable that the film thickness is 5 nm or more 500 nm or less, and preferably 20 nm or more 300 nm or less. Further, it is desirable that, in the silica-containing film, the silicon content (Si content) is 30 mass % or more and 50 mass % or less, and preferably 35 mass % or more and 45 mass % or less, and the phosphorus content (P content) is 0.8 mass % or more and 5.5 mass % or less, and preferably 1 mass % or more and 5 mass % or less. When the film thickness of the inorganic film is smaller than 5 nm, the filiform corrosion resistance may be insufficient. Conversely, when the film thickness is larger than 500 nm, the adhesion may be insufficient. Whereas, when the Si content in the silica-containing film is smaller than 30 mass %, the filiform corrosion resistance may be reduced. Conversely, when the Si content is larger than 50 mass %, it becomes difficult to form the film with general-purpose raw materials, resulting in a higher cost. Further, when the P content in the silica-containing film is smaller than 0.8 mass %, the corrosion resistance may be reduced. Conversely, when the P content is larger than 5.5 mass %, the adhesion may be deteriorated.

Herein, examples of the water dispersible silica for use in the silica-containing film of the present invention may include colloidal silica, and vapor phase silica, and preferably colloidal silica. Then, the colloidal silica is not particularly limited. Specific examples thereof may include spheroidal colloidal silicas such as SNOWTEX-C, SNOWTEX-O, SNOWTEX-N, SNOWTEX-S, SNOWTEX-OL, SNOWTEX-XS, and SNOWTEX-XL manufactured by Nissan Chemical Corporation, and chain colloidal silicas such as SNOWTEX-UP and SNOWTEX-OUP manufactured by Nissan Chemical Corporation. Further, examples of vapor phase silicas may include AEROSIL 130, AEROSIL 200, AEROSIL 200CF, AEROSIL 300, AEROSIL 300CF, AEROSIL 380, and AEROSIL MOX80 manufactured by Nippon Aerosil Co., Ltd.

Further, the phosphorus compound for use in the silica-containing film is added for the purpose of improving the corrosion resistance of one layer or for some other purposes, and is not particularly limited. Preferably, examples thereof may include orthophosphoric acid, phosphoric acid, pyrophosphoric acid, tripolyphosphoric acid, and mixtures of one or two or more selected from salts thereof. Specifically, phosphoric acid, triammonium phosphate, trisodium phosphate, aluminum phosphate, zinc phosphate, magnesium phosphate, and the like can be exemplified.

Further, the silane coupling agent for use in the silica-containing film is added for the purpose of imparting the adhesion and the corrosion resistance or for some other purposes, and is not particularly limited. The silane coupling agent is preferably a silane coupling agent having a reactive functional group such as vinyl group, epoxy group, styryl group, methacryl group, acryl group, amino group, ureido group, mercapto group, sulfido group, isocyanato group, thiocarbonyl group, halo group, or triazine thiol group as a reactive group, and is not particularly limited so long as it finally generates a reactive silanol group. Specific examples thereof may include vinyltrimethoxysilane, 2-(3,4-epoxycyclohexyl)ethyltrimethoxysilane, 3-glycidoxypropyltriethoxysilane, p-styryltrimethoxysilane, 3-methacryloxypropyltrimethoxysilane, 3-acryloxypropyltrimethoxysilane, 3-aminopropyltrimethoxysilane, 3-aminopropyltriethoxysilane, 3-ureidopropyltriethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane. The silane coupling agents may be used alone, or may be used in mixture of two or more thereof. Further, an alkoxy oligomer having an alkoxy silyl group and the reactive functional group in combination is also acceptable. Further, a silicone alkoxy oligomer including a triazine thiol group in the molecule, and a multifunctional silane compound including a vinyl group, an alkyl group, an amino group, or the like are also acceptable.

Then, the water dispersible silica, the phosphorus compound, and the silane coupling agent forming the silica-containing film of the present invention are prepared as a film-forming treatment solution when the silica-containing film is formed on a surface of the aluminum material. The film-forming treatment solution is preferably formed as aqueous solution or an alcohol solution. At that step, if required, a third component such as a surface conditioner, an antimicrobial agent, a fungicide, or a solvent except for water and alcohol is added. For this reason, in the silica-containing film of the present invention, in addition to the water dispersible silica, the phosphorus compound, and the silane coupling agent, the components derived from the third component may be present.

In the coated aluminum material for joining of the present invention, an adhesion layer is formed on a surface of the aluminum material with the silica-containing film as the joining undercoat film provided therebetween. The adhesion layer forms the outermost layer of the coated aluminum material for joining. A coating film layer may be provided between the silica-containing film and the adhesion layer with the aim of relaxing the internal stress between the aluminum material and a resin molded body in the aluminum resin joined material after joining of the resin molded body to the coated aluminum material for joining with the adhesion layer provided thereunder.

Herein, the film thickness of the adhesion layer to be formed on a surface of the aluminum material with the silica-containing film provided thereunder is desirably 1 μm or more and 500 μm or less, preferably 1 μm or more and 200 μm or less, more preferably 2 μm or more and 100 μm or less, and further preferably 5 μm or more and 80 μm or less. When the film thickness is less than 1 μm, joining may be insufficient. Conversely, when the film thickness exceeds 500 μm, the performances are saturated, also resulting in an increase in cost.

Further, when the adhesion layer is formed on the silica-containing film with the coating film layer provided thereunder, the film thickness of the coating film layer is appropriately selected, or determined according to the intended use of the coated aluminum material for joining, and the like, and is not particularly limited. In general, the film thickness is desirably 1 μm or more and 50 μm or less, and preferably 3 μm or more and 30 μm or less. When the film thickness of the coating film layer is less than 1 μm, the effect of the interposition of the coating film may be eliminated. Conversely, when the film thickness exceeds 50 μm, poor adhesion may be caused due to the large film thickness of the coating film.

Then, the film thickness of the sum of the film thickness of the adhesion layer and the film thickness of the coating film layer (which will be hereinafter referred to as "the total film thickness of the adhesion layer and the coating film layer" or simply as "the total film thickness") is desirably in general 2 μm or more and 500 μm or less, preferably 5 μm or more and 200 μm or less, and more preferably 5 μm or more and 80 μm or less. As for the total film thickness of the coating film layer and the adhesion layer, when the total film thickness is smaller than 2 μm, a sufficient corrosion resistance is not exerted. Conversely, when the total film thickness exceeds 500 μm, the effects are saturated.

Herein, in the case where the resin molded body is joined to the surface of the coated aluminum material for joining of the present invention by injection molding or coextrusion molding, when the total film thickness is 5 μm or more, the film thickness of the adhesion layer may only be 1 μm or more, so that sufficient joining is possible. As the effects of the coating film layer, corrosion resistance impartment, and heat-insulating properties impartment during injection molding or during coextrusion molding are observed. Unless sufficient heat-insulating properties are imparted during injection molding or during coextrusion molding, the resin molten during injection molding or during coextrusion molding is deprived of heat in an instant via the aluminum material with good thermal conductivity, and is cooled. Accordingly, the molten resin and the molten adhesion layer are solidified before becoming compatible with each other, and being sufficiently joined with each other, which may result in insufficient joining. As a countermeasure against this problem, it is also possible to increase the thickness of the adhesion layer, and to impart the heat insulating properties to the adhesion layer itself. However, for example, when the adhesion layer is coated thickly by a roll coating method, the pick-up property of the adhesive by a pick-up roll is often bad. Such a case entails a necessity of repeating coating plural times and forming a multilayer coating in order to increase the thickness of the adhesion layer, which may result in an increase in cost. Note that, by forming the coating film layer using a paint with a good pick up property, a heat insulating layer is formed with ease, which enables the reduction of the thickness of the adhesion layer.

Herein, the adhesion paint for forming the adhesion layer is not particularly limited so long as it is a coating type paint, and can provide a coated aluminum material for joining by drying and removing the solvent after coating, or being solidified by cooling, and further is joined with a resin molded body by heating. Such adhesion paints include various thermoplastic resin type and thermosetting resin type adhesives. Examples of the thermoplastic resin type adhesives may include, for example, hot melt type polyamide resin type, hot melt type urethane resin type, hot melt type ethylene vinyl acetate resin type, hot melt type modified polyolefin resin type, hot melt type synthetic rubber type, and other type adhesives, modified polyolefin resin type adhesives of acid modified polypropylene resin type, acid modified polyethylene resin type, urethane modified polypropylene resin type, urethane modified polyethylene resin type, chlorinated polypropylene resin type, and other types, and vinyl chloride/vinyl acetate resin type, polyester resin type, and other types of adhesives. Further, examples of the thermosetting resin type adhesives may include, for example, adhesives of epoxy resin type, phenol resin type, urethane resin type, and other types.

Further, the paint for forming the coating film layer to be provided between the silica-containing film and the adhesion layer (coating film layer forming paint) is also not particularly limited. Mention may be made of various paints such as organic type paints, inorganic type paints, and organic/inorganic hybrid type paints. Examples thereof may include acrylic type paints, polyester type paints, urethane type paints, acrylic urethane type, acrylic polyester type, and epoxy type paints, fluorine type paints, acrylic silicon type paints, urethane silicon type paints, acrylic urethane silicon type paints, ceramics type paints, and titanium oxide type paints.

The coated aluminum material of the present invention having a joining undercoat film as the outermost layer, or the coated aluminum material for joining of the present invention having an adhesion layer as the outermost layer is finally joined with a resin molded body with the adhesion layer provided thereunder, and is used as an aluminum resin composite material.

The resin molded body to be joined with the coated aluminum material or the a coated aluminum material for joining is not particularly limited so long as it can be joined thereto with the joining undercoat film or the adhesion layer provided thereunder. The molded bodies of various thermoplastic resins or thermosetting resins are acceptable. Alternatively, the foam bodies of the thermoplastic resins or the thermosetting resins are also acceptable.

Further, the method for joining the resin molded body to the coated aluminum material or the coated aluminum material for joining is also not particularly limited. Examples thereof may include a method of thermocompression in which a resin molded body previously formed by injection molding or extrusion molding is joined under heating and pressurizing conditions using, for example, a hot press, a method for joining a resin molded body previously formed by coating a thermosetting type, room temperature setting type, or UV setting type adhesive to the joining undercoat film of the coated aluminum material, and a method of insert molding in which a coated aluminum material for joining is set in a mold, and a molten thermoplastic resin is injected on the adhesion layer, thereby performing molding and joining at the same time.

In view of the physical properties required of the aluminum resin composite product material of the present invention, uses, used environments, and the like thereof, as the thermoplastic resin for the resin molded body, preferably, mention may be made of, for example, diene type rubbers such as polyethylene resins, polypropylene resins, styrene butadiene rubbers and butadiene rubbers; non-diene type rubbers such as ethylene propylene rubbers (EPM) and ethylene propylene diene rubbers (EPDM); methacrylic resins; polyvinyl chloride resins; acrylonitrile/butadiene/styrene copolymer (ABS); polycarbonate resins, polyamide resins, polyimide resins, polyarylene sulfide resins such as polyphenylene sulfide (PPS); polyacetal resins; liquid crystalline resins; polyester resins such as polyethylene terephthalate (PET) and polybutylene terephthalate (PBT); polyoxymethylene resins; and syndiotactic polystyrene resins, and mixtures of two or more of these thermoplastic resins. Further, to the thermoplastic resins, after joining to the aluminum coated material, if required, fibrous, particulate, sheet-shaped, or other shaped fillers, and various elastomer components can be added in order to more improve the performances such as the adhesion between the aluminum material and it, the mechanical strength, the heat resistance, the dimensional stability (such as deformation or warp resistance), and electrical properties.

Herein, examples of the filler to be added to the thermoplastic resin for the resin molded body may include inorganic fiber fillers such as glass fiber, carbon fiber, metallic fiber, asbestos fiber, and boron fiber, high melting point organic fiber fillers such as polyamide, fluorine resin, and acrylic resin, powdery fillers such as inorganic powders including quartz powder, glass beads, glass powder, and calcium carbonate, and sheet-shaped fillers of silicates such as glass flake, talk, and mica. Each filler is added in an amount within the range of 250 parts by weight or less, preferably 20 parts by weight or more and 220 parts by weight or less, and more preferably 30 parts by weight or more and 100 parts by weight or less for every 100 parts by weight of the thermoplastic resin. When the amount of the filler to be added exceeds 250 parts by weight, the flowability is reduced. This results in a difficulty in penetration into the concave part of the aluminum shaped body, so that good adhesion strength cannot be obtained, undesirably causing the reduction of the mechanical characteristics.

Further, examples of the elastomer component to be added to the thermoplastic resin for the resin molded body may include elastomers of urethane type, core-shell type, olefin type, polyester type, amide type, styrene type, and other types. The elastomer component is selected in view of the melting temperature of the thermoplastic resin during injection molding, and the like, and is used in an amount of 30 parts by weight or less, and preferably within the range of 3 to 25 parts by weight for every 100 parts by weight of the thermoplastic resin. When the amount of the elastomer component to be added exceeds 30 parts by weight, a further adhesion strength improving effect is not observed, undesirably resulting in the reduction of the mechanical characteristics, or other problems. The addition effect of the elastomer component is produced particularly remarkably when a polyester type resin is used as the thermoplastic resin.

Further, to the thermoplastic resin for the resin molded body, known additives to be generally added to the thermoplastic resin, namely, a flame retarder, a coloring agent such as a dye or a pigment, a stabilizer such as an antioxidant or an ultraviolet absorber, a plasticizer, a lubricant, a slipping agent, a mold lubricant, a crystallization accelerator, a nucleating agent, and the like can be appropriately added according to the required performances.

In the present invention, for the injection molding of the thermoplastic resin to be performed by setting a coated aluminum material or a coated aluminum material for joining in an injection molding mold, general molding conditions required for the thermoplastic resin used can be adopted. However, it is important that the thermoplastic resin molten during injection molding comes in contact with the joining undercoat film of the coated aluminum material or the adhesion layer of the coated aluminum material for joining, and is solidified with reliability. The mold temperature or the cylinder temperature is preferably set relatively higher within the range allowed by the kind and the physical properties of the thermoplastic resin, and further the molding cycle. Particularly, the mold temperature is required to be set at 20° C. or more, and preferably 40° C. or more for the lower limit temperature, and is preferably set at 100° C. or less, and preferably 70° C. or less according to the kind of the thermoplastic resin used for the upper limit temperature.

Then, the thermosetting resin for forming the resin molded body when the aluminum resin composite material of the present invention is prepared is also not particularly limited. Typically, epoxy type resins, phenol type resins, and the like may be mentioned.

Further, other than the thermoplastic resins and the thermosetting resins, for example, normal temperature setting resins of epoxy type, polyester type, and other types, and ultraviolet ray setting resins of acrylic type, epoxy type, and other types can also be used.

Hereinafter, a description will be given to a manufacturing method for manufacturing the coated aluminum material and the coated aluminum material for joining of the present invention.

As for manufacturing of the coated aluminum material of the present invention, preferably, before the film-forming treatment of forming a silica-containing film on a surface of the aluminum material, the surface of the aluminum material may be previously subjected to a pretreatment such as a degreasing treatment or a surface conditioning treatment. Examples of the degreasing treatment may include solvent cleaning using a thinner or the like, and a degreasing treatment using a commercially available acid or alkaline degreasing agent. Further, as the surface conditioning treatment, mention may be made of an acid treatment with an acid solution, and preferably an acid solution with a pH of 6 or less, an alkali treatment with an alkali solution, and preferably an alkali solution with a pH of 8 or more, and/or the like. Herein, as the acid solution for use in the acid treatment of the surface conditioning treatment, examples which can be used may include, for example, the one prepared using the commercially available acid degreasing agent, the one prepared using organic acids including mineral acid such as sulfuric acid, nitric acid, hydrofluoric acid, or phosphoric acid, acetic acid, citric acid, and the like, and the one prepared using an acid reagent including a mixed acid obtained by mixing the mineral acid and the organic acid, or the like. Whereas, as the alkali solution, examples which can be used may include, for example, the one prepared using a commercially available alkaline degreasing agent, the one prepared using an alkali reagent such as sodium hydroxide, the one prepared using a sodium silicate type degreasing agent, and the one prepared by mixing these.

To the surface conditioning treatment of the pretreatment performed using the acid solution and/or the alkali solution, the same method as the operation method and the treatment conditions conventionally performed in the surface conditioning treatment using this kind of acid solution or alkali solution is applicable. For example, with the method such as an immersion method or a spray method, the treatment is performed under the treatment conditions of a treatment temperature of from room temperature to 90° C., and preferably from room temperature to 70° C., a treatment time of about 1 second to 15 minutes, preferably about 2 seconds to 10 minutes, and more preferably from 2 seconds to 3 minutes per step, and the number of steps of generally 2 or more and 6 or less, and preferably 2 or more and 4 or less. Note that, in the surface conditioning treatment of the pretreatment performed using the acid solution and/or the alkali solution a surface of the aluminum material may be etched, or may not be etched.

Then, after subjecting the surface of the aluminum material to the pretreatment, if required, a water washing treatment may be performed. For the water washing treatment, industrial water, ground water, tap water, ion exchanged water, or the like can be used, and is appropriately selected according to the coated aluminum material to be prepared. Further, the aluminum material subjected to the pretreatment is subjected to a dry treatment, if required. The dry treatment may be air drying of being allowed to stand at room temperature, or may be forced drying performed using an air blow, a dryer, a far infrared heater, an oven, or the like.

On a surface of the aluminum material thus subjected to the pretreatment, if required, the film-forming treatment solution including a water dispersible silica, a phosphorus compound, and a silane coupling agent is coated, thereby forming the silica-containing film of the present invention. Herein, for preparing the film-forming treatment solution, the water dispersible silica, the phosphorus compound, and the silane coupling agent are mixed with a necessary third component in a solvent such as water or alcohol so as to attain a Si content in the silica-containing film formed on a surface of the aluminum material of 2 mg/m$^2$ or more and 60 mg/m$^2$ or less, a P content of 0.1 mg/m$^2$ or more and 6.0 mg/m$^2$ or less, and a P/Si mass ratio of the P content to the Si content of 0.02 or more and 0.15 or less, and a content of the silane coupling agent of 0.5 mass % or more and 21 mass % or less.

The film formation treatment when the silica-containing film is formed on a surface of the aluminum material is carried out by, for example, a pre-coating method with a roll coating method, a spray coating method, an immersion method, a bar coating method, an electrostatic coating method, or the like, or a post-coating method with a spray coating method, a spin coating method, an immersion method, an electrostatic coating method, or the like. Further, at that step, if required, a dry treatment is performed after coating. The dry treatment may also be air drying of allowing to stand at room temperature, or may also be forced drying performed using an air blow, a dryer, a far infrared heater, an oven, or the like. When forced drying is performed, forced drying is desirably performed under conditions of generally room temperature to 250° C., for about 1 second to 10 minutes, and preferably about 2 seconds to 5 minutes.

In the present invention, the adhesion paint is coated on the silica-containing film thus formed, thereby to form an adhesion layer. The coating method at that step may be, for example, a pre-coating method with a roll coating method, a spray coating method, an immersion method, a bar coating method, an electrostatic coating method, or the like, or a post-coating method with a spray coating method, a spin coating method, an immersion method, an electrostatic coating method, or the like. Then, also for the dry treatment after coating, a drying method according to the paint may be adopted. Examples of methods which can be exemplified may include a method performed using, for example, an air blow, a dryer, or an oven under drying conditions of room temperature to 300° C., and for 5 seconds to 24 hours.

Further, also for the case where a coating film layer is formed before the formation of the adhesion layer, it is essential only that the coating film layer forming paint is coated on the silica-containing film, thereby forming a coating film layer, then, forming the adhesion layer on the coating film layer. Without a change from the case where a conventional multilayer coating film is formed, for example, it is essential only that a topcoat paint is coated on the coating film of the formed first layer by a pre-coating method such as a roll coating method, a spray coating method, an immersion method, a bar coating method, or an electrostatic coating, or a post-coating method such as a spray coating method, a spin coating method, an immersion method, or an electrostatic coating method, and then, drying is performed by the drying method according to the coated topcoat paint.

Effects of Invention

A coated aluminum material having a silica-containing film as an adhesion undercoat film of the present invention is high in adhesion strength between it and an adhesion layer formed thereon (on a surface thereof). In addition, the excellent adhesion strength is kept even when the coated aluminum material is exposed to severe corrosive environment. Further, even at the portion where the adhesion undercoat film is exposed except for the junction part at which the adhesion layer is not present, the excellent corrosion resistance can be held. Thus, a high reliability can be kept over a long term.

Further, a coated aluminum material for joining having an adhesion layer of the present invention is high in adhesion strength between it and a resin molded body to be joined with the adhesion layer provided thereunder. In addition, the excellent adhesion strength is kept even when the coated aluminum material for joining is exposed to severe corrosive environment. Further, even at the portion where the adhesion layer or the adhesion undercoat film is exposed except for the junction part to which the resin molded body is joined, the excellent corrosion resistance can be held. Thus, a high reliability can be kept over a long term.

Further, for the aluminum resin composite material of the present invention, at the interface between the aluminum material and the resin molded body (aluminum/resin interface), as an adhesion undercoat film, the silica-containing film and the adhesion layer are interposed. The silica-containing film exerts an excellent adhesion strength with respect to the aluminum material, and the adhesion layer exerts an excellent adhesion strength with respect to the resin molded body. For this reason, even when the aluminum resin composite material is exposed to severe corrosive environment, the excellent adhesion strength and corrosion resistance can be held, and a high reliability can be kept over a long term.

Therefore, the aluminum resin composite material of the present invention can be preferably used for metal—resin integrally molded components in a wide variety of fields including, for example, various components for automobile, various components for home electrical appliance, casings, and heat exchanger components for various industrial equipment, and particularly can be preferably used for the metal—resin integrally molded component in which a resin molded body protrudes from some surface of the aluminum shaped body in a butting state, and which is required to have a high bonding strength.

BRIEF DESCRIPTION OF DRAWINGS

FIG. 1 is an explanatory view for illustrating a testing method of tensile shear strength evaluation according to the ISO 19095 testing method, wherein (a) in FIG. 1 shows a joining aluminum specimen for tensile shear strength evaluation, and (b) in FIG. 1 shows a testing method for tensile shear strength evaluation.

FIG. 2 is an explanatory view of an adhesion specimen for use in a testing method of an adhesive evaluation according to the JIS K 6829 testing method.

DESCRIPTION OF EMBODIMENTS

Hereinafter, preferred embodiments of the present invention will be specifically described by way of Examples and Comparative Examples.

[Examples 1 to 22 and Comparative Examples 1 to 12]

As an aluminum material, an aluminum sheet (JIS 5052-H18) with dimensions of 70 mm×150 mm×1.0 mm was prepared. Each prepared aluminum sheet of respective Examples and Comparative Examples was subjected to a pretreatment, a film-forming treatment of a silica-containing film, and formation of a coating film shown below, thereby preparing each coated aluminum material of respective Examples and Comparative Examples.

[Pretreatment]

In respective Examples and Comparative Examples, each of the aluminum sheets was subjected to the following pretreatment.

Namely, a degreasing treatment in which the aluminum sheet was immersed in a 2 mass % aqueous solution of a degreasing agent (trade name: SURFCLEANER 155 manufactured by NIPPON PAINT Co., Ltd.) containing sodium metasilicate under the conditions of 60° C. and 30 seconds was performed, followed by water washing and drying.

[Film-Forming Treatment]

As a treatment solution for forming a silica-containing film, using the colloidal silicas and additive resins, and the like shown in Table 1, the phosphorus compounds, the silane coupling agents, and water or isopropanol (iso-PrOH) as a solvent shown in Table 2, a film-forming treatment solution with each composition shown in Table 2 and Table 3 was prepared.

TABLE 1

| | | Colloidal silica | | | |
|---|---|---|---|---|---|
| | | Manufacturer | Solid content concentration (wt %) | Average particle Size (nm) | Dispersion medium |
| Colloidal silica | ST-C | Nissan Chemical Corporation | 20 | 10-20 | Water |
| | ST-O | Nissan Chemical Corporation | 20 | 10-21 | Water |
| | ST-UP | Nissan Chemical Corporation | 20 | 40-300 chain-shaped | Water |
| | ST-OL | Nissan Chemical Corporation | 20 | 40-50 | Water |
| | ST-40 | Nissan Chemical Corporation | 40 | 10-20 | Water |
| | IPA-ST | Nissan Chemical Corporation | 30 | 10-20 | iso-PrOH |

TABLE 2

Composition of film-forming treatment solutions of Examples 1-11 and Comparative Examples 1-8

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Colloidal silica | ST-C | — | — | 4.5 | — | — | — | — | — | — | — |
| | ST-O | — | 15 | — | — | — | — | 15 | — | — | 15 |

TABLE 2-continued

Composition of film-forming treatment solutions of Examples 1-11 and Comparative Examples 1-8

| | | 1 | 2 | 3 | 4 | 5 | 6 | 7 | 8 | 9 | 10 |
|---|---|---|---|---|---|---|---|---|---|---|---|
| | ST-OL | 48 | — | — | — | — | — | — | — | — | — |
| | ST-UP | — | — | — | 0.9 | 9 | — | — | — | — | — |
| | ST-40 | — | — | — | — | — | — | — | — | — | — |
| | IPA-ST | — | — | — | — | — | 15 | — | 15 | 15 | — |
| Phosphorus compound | Phosphoric acid | 1.8 | 0.3 | 0.13 | 0.02 | 0.4 | 0.4 | 0.2 | 0.4 | 0.4 | 0.2 |
| Silane coupling agent | KBE403(epoxy group) | 0.2 | — | — | — | 0.1 | — | — | — | — | — |
| | KBE803(thiol group) | — | 0.3 | — | 0.03 | — | 1 | 0.1 | 1.6 | 1 | 0.1 |
| | KBE903(amino group) | — | — | 0.05 | — | — | — | — | — | — | — |
| Resin | polyacrylic acid | — | — | — | — | — | — | — | — | — | — |
| | Pentalite | — | — | — | — | — | — | — | — | — | — |
| | MODEPICS302 | — | — | — | — | — | — | — | — | — | — |
| The balance | Water | 50 | 84.4 | 95.32 | — | 90.5 | — | 84.7 | 10 | — | 84.7 |
| | iso-PrOH | — | — | — | 99.05 | — | 83.6 | — | 73 | 83.6 | — |

| | | Example | Comparative Examples | | | | | | | |
|---|---|---|---|---|---|---|---|---|---|---|
| | | 11 | 1 | 2 | 3 | 4 | 5 | 6 | 7 | 8 |
| Colloidal silica | ST-C | — | — | — | — | — | — | — | — | — |
| | ST-O | — | 2 | 15 | — | 50 | 50 | — | — | — |
| | ST-OL | — | — | — | — | — | — | — | 12 | — |
| | ST-UP | 4.5 | — | — | — | — | — | 9 | — | — |
| | ST-40 | — | — | — | — | — | — | — | — | 50 |
| | IPA-ST | — | — | — | 3.5 | — | — | — | — | — |
| phosphorus compound | phosphoric acid | 0.1 | 0.1 | 3 | 0.1 | 0.3 | 0.3 | 0.5 | 0.3 | — |
| Silane coupling agent | KBE403(epoxy group) | — | — | — | — | — | — | 0.1 | — | — |
| | KBE803(thiol group) | 0.5 | — | 0.9 | — | 0.3 | 0.3 | — | — | — |
| | KBE903(amino group) | — | — | — | — | — | — | — | — | 10 |
| Resin | Polyacrylic acid | — | — | — | — | — | — | — | 0.1 | — |
| | Pentalite | — | — | — | — | — | — | — | 0.003 | — |
| | MODEPICS302 | — | — | — | — | — | — | — | — | 50 |
| The balance | Water | 44.9 | 97.9 | 81.1 | — | 49.4 | 49.4 | 90.4 | 87.6 | — |
| | iso-PrOH | 50 | — | — | 96.4 | — | — | — | — | — |

TABLE 3

Composition of film-forming treatment solutions of Examples 12-22 and Comparative Examples 9-12

| | | Examples | | | | | | | |
|---|---|---|---|---|---|---|---|---|---|
| | | 12 | 13 | 14 | 15 | 16 | 17 | 18 | 19 |
| Colloidal silica | ST-C | — | — | 4.5 | — | — | — | — | — |
| | ST-O | — | 15 | — | — | — | — | 15 | — |
| | ST-OL | 48 | — | — | — | — | — | — | — |
| | ST-UP | — | — | — | 0.9 | 9 | — | — | — |
| | ST-40 | — | — | — | — | — | — | — | — |
| | IPA-ST | — | — | — | — | — | 15 | — | 15 |
| Phosphorus compound | Phosphoric acid | 1.8 | 0.3 | 0.13 | 0.02 | 0.26 | 0.4 | 0.2 | 0.4 |
| Silane coupling agent | KBE403(epoxy group) | 0.2 | 0.3 | — | 0.03 | — | — | — | — |
| | KBE803(thiol group) | — | — | — | — | 0.1 | 1 | 0.1 | 1.6 |
| | KBE903(amino group) | — | — | 0.05 | — | — | — | — | — |
| Resin | Polyacrylic acid | — | — | — | — | — | — | — | — |
| | Pentalite | — | — | — | — | — | — | — | — |
| | MODEPICS302 | — | — | — | — | — | — | — | — |
| The balance | Water | 50 | 84.4 | 95.32 | — | 90.64 | — | 84.7 | 10 |
| | iso-PrOH | — | — | — | 99.05 | — | 83.6 | — | 73 |

TABLE 3-continued

Composition of film-forming treatment solutions
of Examples 12-22 and Comparative Examples 9-12

| | | Examples | | | Comparative Examples | | | |
|---|---|---|---|---|---|---|---|---|
| | | 20 | 21 | 22 | 9 | 10 | 11 | 12 |
| Colloidal silica | ST-C | — | — | — | — | — | — | — |
| | ST-O | — | — | — | — | — | — | — |
| | ST-OL | — | — | — | — | — | — | — |
| | ST-UP | 9 | 9 | 9 | — | 9 | 9 | — |
| | ST-40 | — | — | — | 50 | — | — | 50 |
| | IPA-ST | — | — | — | — | — | — | — |
| Phosphorus compound | Phosphoric acid | 0.26 | 0.26 | 0.26 | — | 0.26 | 0.26 | — |
| Silane Coupling agent | KBE403(epoxy group) | — | — | — | — | — | — | — |
| | KBE803(thiol group) | 0.1 | 0.1 | 0.1 | — | 0.1 | 0.1 | — |
| | KBE903(amino group) | — | — | — | 10 | — | — | 10 |
| Resin | Polyacrylic acid | — | — | — | — | — | — | — |
| | Pentalite | — | — | — | — | — | — | — |
| | MODEPICS302 | — | — | — | 50 | — | — | 50 |
| The balance | Water | 90.64 | 90.64 | 90.64 | — | 90.64 | 90.64 | — |
| | iso-PrOH | — | — | — | — | — | — | — |

[Manufacturing of coated aluminum material]

In each of Examples 1, 3, 5 to 9, 12, 14, and 16 to 22, and Comparative Examples 1 to 4, 6 to 7, and 10 to 12, after completion of the pretreatment, using a bar coater, the film-forming treatment solution with each composition shown in Table 2 or Table 3 was coated so as to achieve a coating amount of 1 g/m². Then, at a peak temperature (PMT: Peak metal temperature) of 180° C., drying was performed for 1 minute, thereby forming a silica-containing film on a surface of the aluminum sheet.

Further, in Examples 2 and 13, after completion of the pretreatment, using a bar coater, the film-forming treatment solution with each composition shown in Table 2 or Table 3 was coated so as to achieve a coating amount of 2.5 g/m². Then, at a PMT of 180° C., drying was performed for 1 minute, thereby forming a silica-containing film on a surface of the aluminum sheet.

Further, in Examples 4 and 15, after completion of the pretreatment, using a spray gun, the film-forming treatment solution with each composition shown in Table 2 or Table 3 was coated so as to achieve a coating amount of 25 g/m². Then, at a PMT of 180° C., drying was performed for 1 minute, thereby forming a silica-containing film on a surface of the aluminum sheet.

Further, in Example 10, after completion of the pretreatment, using a bar coater, the film-forming treatment solution with each composition shown in Table 2 was coated so as to achieve a coating amount of 2 g/m². Then, at a PMT of 220° C., drying was performed for 1 minute, thereby forming a silica-containing film on a surface of the aluminum sheet.

Further, in Example 11, after completion of the pretreatment, using a bar coater, the film-forming treatment solution with each composition shown in Table 2 was coated so as to achieve a coating amount of 10 g/m². Then, at a peak temperature (PMT: Peak metal temperature) of 220° C., drying was performed for 1 minute, thereby forming a silica-containing film on a surface of the aluminum sheet.

Further, in Comparative Example 5, after completion of the pretreatment, using a bar coater, the film-forming treatment solution with each composition shown in Table 2 (the same as that in Comparative Example 4) was coated so as to achieve a coating amount of 2 g/m². Then, at a PMT of 180° C., drying was performed for 1 minute, thereby forming a silica-containing film on a surface of the aluminum sheet.

Then, in Comparative Examples 8 and 9, after completion of the pretreatment, using a bar coater, the film-forming treatment solution with each composition shown in Table 2 or Table 3 was coated so as to achieve a coating amount of 1 g/m². Then, at a PMT of 100° C., drying was performed for 1 minute, thereby forming a silica-containing film on a surface of the aluminum sheet.

As for each coated aluminum material of respective Examples and Comparative Examples formed in the foregoing manner, the silicon content (Si content: mg/m²) and the phosphorus content (P content: mg/m²) of the silica-containing film formed on a surface thereof were measured by fluorescent X ray analysis, respectively. For this measurement, a silica-containing film was prepared on a 99.999% pure aluminum sheet by the same method as that in respective Examples and Comparative Examples. Thus, the silicon content (Si content: mg/m²) and the phosphorus content (P content: mg/m²) contained in unit area of the silica-containing film were subjected to quantitative analysis.

[Manufacturing of coated aluminum material for joining]

Then, on a surface of each coated aluminum material of respective Examples and Comparative Examples, an adhesion layer, or a coating film layer and an adhesion layer were stacked with the silica-containing film provided therebetween, thereby manufacturing each coated aluminum material for joining of respective Examples and Comparative Examples. Herein, for the coating film layer and the adhesion layer, the coating film layer forming paint and the adhesion layer forming adhesion paint shown in Table 4 shown below were used, and were coated so that the coating film layer becomes the lower layer, and the adhesion layer becomes the upper layer by the following method, thereby forming a coating film with each film thickness shown in Table 5 and Table 6.

TABLE 4

Coating film layer forming paint and adhesion layer forming paint

| | | Paint name | Manufacturer | Resin type | |
|---|---|---|---|---|---|
| Coating film layer forming paint | A | Precolor TX4427 | BASF | Polyester type | Thermosetting |
| | B | V nit #120 | DAI NIPPON TORYO Co., Ltd. | Epoxy type | Thermosetting |
| | G | V nit #500 | DAI NIPPON TORYO Co., Ltd. | Polyester type | Thermosetting |
| | Si-E | silica-added UNISTOLE R-300 | MITSUI CHEMICAL Inc. | Acid modified olefin type | Thermoplastic |
| Adhesion layer forming adhesion paint | C | Hardlen TD-15B | TOYOBO Co., Ltd. | Maleic anhydride-modified olefin type | Thermoplastic |
| | D | Hardlen NZ-1022 | TOYOBO Co., Ltd. | Maleic anhydride-modified olefin type | Thermoplastic |
| | E | UNISTOLE R-300 | MITSUI CHEMICAL Inc. | Acid modified olefin type | Thermoplastic |
| | F | EP106NL | CEMEDINE Co., Ltd. | Epoxy type | Thermosetting |

In Example 1, a paint A was subjected to bar coat coating, and was subjected to a baking treatment at a PMT of 210° C. for 60 seconds to be dried, thereby forming a 5-μm coating film (coating film layer). Then, an adhesion paint C was subjected to bar coat coating, and was subjected to a baking treatment at a PMT of 130° C. for 60 seconds to be dried, thereby forming a 25-μm coating film (adhesion layer). As a result, a specimen (coated aluminum material for joining) with a total film thickness of 30 μm was prepared.

In Example 2, a paint B was subjected to bar coat coating, and was subjected to a baking treatment at a PMT of 210° C. for 60 seconds to be dried, thereby forming a 10-μm coating film (coating film layer). Then, an adhesion paint D was subjected to bar coat coating, thereby forming a 5-μm coating film (adhesion layer), and was subjected to a baking treatment at a PMT of 150° C. for 60 seconds to be dried, thereby preparing a specimen (coated aluminum material for joining) with a total film thickness of 15 μm.

In Example 3, an adhesion paint C was subjected to bar coat coating, and was subjected to a baking treatment at a PMT of 130° C. for 60 seconds to be dried, thereby forming a coating film (adhesion layer) with a film thickness of 15 μm, resulting in preparation of a specimen (coated aluminum material for joining).

In Example 4, an adhesion paint C was subjected to bar coat coating, and was subjected to a baking treatment at a PMT of 130° C. for 60 seconds to be dried, thereby forming a coating film (adhesion layer) with a film thickness of 40 μm, resulting in preparation of a specimen (coated aluminum material for joining).

In Example 5, the adhesion paint D was subjected to bar coat coating, and was subjected to a baking treatment at a PMT of 150° C. for 60 seconds to be dried, thereby forming a coating film (adhesion layer) with a film thickness of 20 μm, resulting in preparation of a specimen (coated aluminum material for joining).

In Example 6, an adhesion paint E was subjected to bar coat coating, and was subjected to a baking treatment at a PMT of 220° C. for 60 seconds to be dried, thereby forming a coating film (adhesion layer) with a film thickness of 35 μm, resulting in preparation of a specimen (coated aluminum material for joining.

In Example 7, the adhesion paint E was subjected to bar coat coating, and was subjected to a baking treatment at a PMT of 220° C. for 60 seconds to be dried, thereby forming a coating film (adhesion layer) with a film thickness of 20 μm, resulting in preparation of a specimen (coated aluminum material for joining).

In Example 8, an adhesion paint F was subjected to bar coat coating, and was subjected to a baking treatment at a PMT of 150° C. for 60 seconds to be dried, thereby forming a coating film (adhesion layer) with a film thickness of 35 μm, resulting in preparation of a specimen (coated aluminum material for joining).

Note that, in Examples 9 to 11, without forming either of the coating film layer and the adhesion layer, the coated aluminum material was used as an Example as it was.

In Example 12, the paint A was subjected to bar coat coating, and was subjected to a baking treatment at a PMT of 210° C. for 60 seconds to be dried, thereby forming a 10-μm coating film (coating film layer). Then, the adhesion paint C was subjected to bar coat coating, and was subjected to a baking treatment at a PMT of 130° C. for 60 seconds to be dried, thereby forming a 5-μm coating film (adhesion layer), thereby preparing a specimen (coated aluminum material for joining) with a total film thickness of 15 μm.

In Example 13, the paint B was subjected to bar coat coating, and was subjected to a baking treatment at a PMT of 210° C. for 60 seconds to be dried, thereby forming a coating film (coating film layer) with a film thickness of 10 μm. Then, the adhesion paint D was subjected to bar coat coating, thereby forming a 2-μm coating film (adhesion layer), and was subjected to a baking treatment at a PMT of 150° C. for 60 seconds to be dried, thereby preparing a specimen (coated aluminum material for joining) with a total film thickness of 12 μm.

In Example 14, the adhesion paint C was subjected to bar coat coating, and was subjected to a baking treatment at a PMT of 130° C. for 60 seconds to be dried, thereby forming a coating film (adhesion layer) with a film thickness of 10 μm, resulting in preparation of a specimen (coated aluminum material for joining).

In Example 15, the adhesion paint D was subjected to bar coat coating, and was subjected to a baking treatment at a PMT of 150° C. for 60 seconds to be dried, thereby forming a coating film (adhesion layer) with a film thickness of 40 μm, resulting in preparation of a specimen (coated aluminum material for joining).

In Example 16, the adhesion paint C was subjected to bar coat coating, and was subjected to a baking treatment at a PMT of 130° C. for 60 seconds to be dried, thereby forming a coating film (adhesion layer) with a film thickness of 20 μm, resulting in preparation of a specimen (coated aluminum material for joining).

In Example 17, an adhesion paint G was subjected to bar coat coating, and was subjected to a baking treatment at a PMT of 210° C. for 60 seconds to be dried, thereby forming a coating film (adhesion layer) with a film thickness of 10 μm. The adhesion paint E was subjected to bar coat coating, and was subjected to a baking treatment at a PMT of 220° C. for 60 seconds to be dried, thereby forming a coating film (adhesion layer) with a film thickness of 10 μm, resulting in preparation of a specimen (coated aluminum material for joining).

In Example 18, the adhesion paint E was subjected to bar coat coating, and was subjected to a baking treatment at a PMT of 220° C. for 60 seconds to be dried, thereby forming a coating film (adhesion layer) with a film thickness of 20 μm, resulting in preparation of a specimen (coated aluminum material for joining).

In Example 19, the adhesion paint F was subjected to bar coat coating, and was subjected to a baking treatment at a PMT of 120° C. for 60 seconds to be dried, thereby vaporizing the solvent, and forming a coating film (adhesion layer) with a film thickness of 50 μm, resulting in preparation of a specimen (coated aluminum material for joining).

In Example 20, the adhesion paint C was subjected to bar coat coating, and was subjected to a baking treatment at a PMT of 130° C. for 60 seconds to be dried, thereby forming a 5-μm coating film (adhesion layer), resulting in preparation of a specimen (coated aluminum material for joining).

In Example 21, the adhesion paint G was subjected to bar coat coating, and was subjected to a baking treatment at a PMT of 210° C. for 60 seconds to be dried, thereby forming a 4-μm coating film (adhesion layer). Then, the adhesion paint C was subjected to bar coat coating, and was subjected to a baking treatment at a PMT of 130° C. for 60 seconds to be dried, thereby forming a 1-μm coating film (adhesion layer), resulting in preparation of a specimen (coated aluminum material for joining) with a total film thickness of 5 μm.

In Example 22, the paint G was subjected to bar coat coating, and was subjected to a baking treatment at a PMT of 210° C. for 60 seconds to be dried, thereby forming a 9-μm coating film (coating film layer). Then, the adhesion paint C was subjected to bar coat coating, and was subjected to a baking treatment at a PMT of 130° C. for 60 seconds to be dried, thereby forming a 1-μm coating film (adhesion layer), resulting in preparation of a specimen (coated aluminum material for joining) with a total film thickness of 10 μm.

In Comparative Example 1, the adhesion paint C was subjected to bar coat coating, and was subjected to a baking treatment at a PMT of 130° ° C. for 60 seconds to be dried, thereby forming a 20-μm coating film (adhesion layer), resulting in preparation of a specimen (coated aluminum material for joining). The coated aluminum material for joining of Comparative Example 1 has a silica-containing film with substantially the same P/Si mass ratio as that described in Example 2 of PTL 5, and is free from a silane coupling agent.

In Comparative Example 2, the adhesion paint D was subjected to bar coat coating, and was subjected to a baking treatment at a PMT of 150° C. for 60 seconds to be dried, thereby forming a 2-μm coating film (adhesion layer), resulting in preparation of a specimen (coated aluminum material for joining). The silane coupling agent content exceeds the upper limit value.

In Comparative Example 3, the paint A was subjected to bar coat coating, and was subjected to a baking treatment at a PMT of 210° C. for 60 seconds to be dried, thereby forming a 5-μm coating film (coating film layer). Then, the adhesion paint C was subjected to bar coat coating, and was subjected to a baking treatment at a PMT of 130° C. for 60 seconds to be dried, thereby forming a 30-μm coating film (adhesion layer), resulting in preparation of a specimen (coated aluminum material for joining) with a total film thickness of 35 μm. The coated aluminum material for joining of Comparative Example 3 has a silica-containing film with substantially the same P/Si mass ratio as that described in Example 9 of PTL 5, and is free from a silane coupling agent.

In Comparative Example 4, the paint B was subjected to bar coat coating, and was subjected to a baking treatment at a PMT of 210° C. for 60 seconds to be dried, thereby forming a coating film (coating film layer) with a film thickness of 5 μm. Then, the paint D was subjected to bar coat coating, thereby forming a 30-μm coating film (adhesion layer), and was subjected to a baking treatment at a PMT of 150° C. for 60 seconds to be dried, thereby forming a specimen (coated aluminum material for joining) with a total film thickness of 35 μm. The P/Si mass ratio is less than the lower limit value.

In Comparative Example 5, the adhesion paint E was subjected to bar coat coating, and was subjected to a baking treatment at a PMT of 220° C. for 60 seconds to be dried, thereby forming a coating film (adhesion layer) with a film thickness of 20 μm, resulting in preparation of a specimen (coated aluminum material for joining). The P/Si mass ratio is smaller than the lower limit value.

In Comparative Example 6, the paint B was subjected to bar coat coating, and was subjected to a baking treatment at a PMT of 210° C. for 60 seconds to be dried, thereby forming a coating film (coating film layer) with a film thickness of 5 μm. Then, the adhesion paint E was subjected to bar coat coating, thereby forming a 30-μm coating film (adhesion layer), and was subjected to a baking treatment at a PMT of 220° C. for 60 seconds to be dried, thereby forming a specimen (coated aluminum material for joining) with a total film thickness of 35 μm. The P/Si mass ratio exceeds the upper limit value.

In Comparative Example 7, the adhesion paint C was subjected to bar coat coating, and was subjected to a baking treatment at a PMT of 130° C. for 60 seconds to be dried, thereby forming a 40-μm coating film (adhesion layer), resulting in preparation of a specimen (joining aluminum coated material coated aluminum material for joining). The coated aluminum material for joining of Comparative Example 7 has a silica-containing film with substantially the same P/Si mass ratio as that described in Example 2 of PTL 6, and is free from a silane coupling agent.

In Comparative Example 8, the adhesion paint E was subjected to bar coat coating, and was subjected to a baking treatment at a PMT of 220° C. for 60 seconds to be dried, thereby forming a coating film (adhesion layer) with a film thickness of 20 μm, resulting in preparation of a specimen (coated aluminum material for joining). The coated aluminum material for joining of Comparative Example 8 is the chemical conversion film (silica-containing film) of PTL 1 in which a phosphorus compound is not added, the P/Si mass ratio is zero (0), and a silane coupling agent is added in an amount exceeding 21 mass %.

In Comparative Example 9, the adhesion paint E was subjected to bar coat coating, and was subjected to a baking treatment at a PMT of 220° C. for 60 seconds to be dried, thereby forming a coating film (adhesion layer) with a film thickness of 40 μm, resulting in preparation of a specimen (coated aluminum material for joining).

In Comparative Example 10, the adhesion paint C was subjected to bar coat coating, and was subjected to a baking treatment at a PMT of 130° C. for 60 seconds to be dried, thereby forming a coating film (adhesion layer) with a film thickness of 4 μm, resulting in preparation of a specimen (coated aluminum material for joining).

In Comparative Example 11, the paint G was subjected to bar coat coating, and was subjected to a baking treatment at a PMT of 210° C. for 60 seconds to be dried, thereby forming a coating film (coating film layer) with a film thickness of 2 μm. Then, the adhesion paint C was subjected to bar coat coating, thereby forming a 2-μm coating film (adhesion layer), and was subjected to a baking treatment at a PMT of 130° C. for 60 seconds to be dried, thereby preparing a specimen (coated aluminum material for joining) with a total film thickness of 4 μm.

In Comparative Example 12, further, for the paint Si-E for forming the coating film layer shown in Table 4, a paint Si-E obtained by adding a fine powder silica (calcium-ion exchanged silica; trade name: Sylomask 52 manufactured by FUJI SILYSIA CHEMICAL LTD.) in an amount equivalent to 10 mass % of the solid content of the adhesion paint E in the adhesion layer forming adhesion paint E (solid content 18%) shown in Table 4 was used, and subjected to bar coat coating. Then, a baking treatment at a PMT of 220° C. for 60 seconds was performed for drying, thereby forming a coating film (coating film layer) with a film thickness of 10 μm. Then, the adhesion paint E was subjected to bar coat coating, thereby forming a 10-μm coating film (adhesion layer), and was subjected to a baking treatment at a PMT of 220° C. for 60 seconds to be dried, thereby preparing a specimen (coated aluminum material for joining) with a total film thickness of 20 μm.

[Preparing of aluminum resin composite material (injection integrally molded product)]

The coated aluminum materials for joining of Examples 1 to 7, and 12 to 22, and the coated aluminum materials for joining of Comparative Examples 1 to 12 were prepared in required numbers, respectively. From the coated aluminum materials for joining or the coated aluminum materials, in Examples 1 to 7 and Comparative Examples 1 to 8, in order to measure three tensile shear strengths (tensile shear strength, tensile shear strength after wetting test, and tensile shear strength after salt spray test (SST)) described later with the number of tests N=3, respectively, nine joining aluminum specimens each including the resin part (resin molded body) joined thereto were prepared, and in Examples 12 to 22 and Comparative Examples 9 to 12, in order to measure four tensile shear strengths (tensile shear strength, tensile shear strength after wetting test, tensile shear strength after salt spray test (SST), and tensile shear strength after PCT test) described later with the number of tests N=3, respectively, twelve joining aluminum specimens each including the resin part (resin molded body) joined thereto were prepared.

Namely, each of the coated aluminum materials for joining 2 of Examples 1 to 7 and 12 to 22, and Comparative Examples 1 to 12 was set in a mold of an injection molding machine. Thus, using a polypropylene resin (GCS 30 NOVATEC prepared by Japan Polypropylene Corporation), a joining aluminum specimen (aluminum resin composite material) for tensile shear strength evaluation according to the ISO 19095 testing method shown in (a) in FIG. 1 was prepared. For the prepared joining aluminum specimen, while the dimensions of the coated aluminum material for joining 2 were 20 mm×45 mm×1 mmt, the dimensions of the resin part 1 were 10 mm×45 mm×3 mmt; the area of the junction part 3 between the joining aluminum coated material coated aluminum material for joining 2 and the resin part 1 was 10 mm×5 mm; and the injection molding conditions for manufacturing each specimen were a resin temperature of 250° C., a mold temperature of 50° C., an injection speed of 40 mm/s, a holding pressure of 30 MPa, and an injection time of 8 seconds.

Of the nine joining aluminum specimens (aluminum resin composite materials) of Examples 1 to 7 and Comparative Examples 1 to 8 thus prepared, three specimens were used as it were for the tests, and the remaining six specimens were used as for the corrosion resistance tests (three for the salt spray test, and three for the wetting test). After conducting each test, the tensile shear strength evaluation and the appearance evaluation of the coated part were performed. Further, of the twelve joining aluminum specimens (aluminum resin composite materials) of Examples 12 to 22 and Comparative Examples 9 to 12 thus prepared, three specimens were used as it were for the tests, further, the remaining nine specimens were used as for the corrosion resistance tests (three for the salt spray test, and three for the wetting test, and three for the PCT test). After conducting each test, the tensile shear strength evaluation and the appearance evaluation of the coated part were performed.

[Tensile Shear Strength Evaluation of Aluminum Resin Composite Material (Injection Integrally Molded Product)]

As for the tensile shear strength, with the method according to the ISO 19095 testing method shown in (b) in FIG. 1, there was carried out a test in which the aluminum resin composite material (specimen) was fixed at a jig 4, and the upper end of the resin molded body was applied with a load 5 from above at a speed of 10 mm/min, thereby breaking the junction part between the aluminum material and the resin molded body. The breaking force of the aluminum resin composite material (injection integrally molded product) of the specimen was taken as the tensile shear strength. The tensile shear strength test was carried out with N=3 as it was, for after the salt spray test (JIS K 5600 7-1), and for after the wetting test (JIS K 5600 7-2), respectively. Each resulting average strength is shown as the tensile shear strength in Table 5 and Table 6.

[Manufacturing of aluminum/aluminum adhesion product]

In Example 8, as shown in FIG. 2, coated aluminum materials for joining were prepared in a required number. From the coated aluminum materials for joining, 18 specimens having dimensions of 25 mm×150 mm were cut out. A support body 6 with dimensions of an area (grab area 6a) of 25 mm×38 mm was attached to one end of each specimen. Further, the specimens thus obtained were used in pairs of two thereof. With each pair of specimens, respective adhesion layers on the other end without the support body 6 were stacked one on another. A junction part 7 was fixed with a clip so that the area (junction area 7a) of the stacked junction part 7 becomes 25 mm×25 mm, and was baked and dried in an oven under the conditions of a set temperature of 150° C. and for 20 minutes, thereby manufacturing nine adhesion specimens according to the JIS K 6829 testing method.

Further in Example 19, coated aluminum materials for joining were prepared in a required number. From the coated aluminum materials for joining, 24 specimens having dimensions of 25 mm×150 mm were cut out. In the same manner as in the case of Example 8, 12 adhesion specimens according to the JIS K 6829 testing method were prepared.

Further, in Example 9, as shown in FIG. 2, coated aluminum materials were prepared in a required number. From the coated aluminum materials, 18 specimens having dimensions of 25 mm×150 mm were cut out. A support body 6 with dimensions of an area (grab area 6a) of 25 mm×38 mm was attached to one end of each specimen for grasping the specimen. Further, the specimens thus obtained were used in pairs of two thereof. Roughly in the same manner as in the case of Example 8, with one specimen of each pair, on the end on the side without the support body 6, 2.5 g of normal temperature setting adhesive (main agent: curing agent=10:5; Araldite 2014-1 manufactured by HUNTSMAN Co.) was uniformly coated to the portion (junction part 7) with an area (junction area 7a) of 25 mm×25 mm. On the portion coated with the adhesive, the end on the side without the support body 6 of the other specimen was stacked, thereby forming a junction part 7. The junction part 7 was fixed with a clip, and was dried under the conditions of a set temperature of 60° C. and for 3 hours, thereby manufacturing 9 adhesion specimens according to the JIS K 6829 testing method.

[Shear Strength Evaluation of Aluminum/Aluminum Adhesion Product]

As for adhesion specimens of Examples 8, 9, and 19 prepared in the manner described up to this point, a tensile test was conducted under the conditions of a LOAD SPEED of 50 mm/min and a grab area of 38 mm×25 mm according to the JIS K 6829 testing method, thereby measuring the breaking force when the junction part 7 of the adhesion specimen was broken. The measured value was referred to as the tensile shear strength. For the adhesion specimen before the following corrosion resistance test, for the adhesion specimen after the following corrosion resistance test (salt spray test), and for the adhesion specimen after the following corrosion resistance test (wetting test), the shear strength tests were conducted with N=3, respectively. Each obtained average strength was referred to as the tensile shear strength, and is shown in Table 5 and Table 6.

[Corrosion resistance test (salt spray test (SST): 500 hr, wetting test: 500 hr)]

As for the joining aluminum specimens and adhesion specimens of respective Examples and Comparative Examples prepared in the manner described up to this point, the following salt spray test (JIS K 5600 7-1) was conducted for 500 hours, and the wetting test (JIS K 5600 7-2) was conducted for 500 hours. As for Examples 1 to 9, and 12 to 22, and Comparative Examples 1 to 11, for the junction part between the aluminum material and the resin molded body, the tensile shear strength was evaluated after the corrosion resistance test, and further, for the coated surface except for the junction part, the adhesion (cross-cut adhesion) was evaluated by the adhesion evaluation method (cross-cut method) of JIS K 5600. Further, the appearance was evaluated, and was taken as the evaluation of the corrosion resistance performance.

Further, for Examples 10 and 11, each resulting coated aluminum material was used as it was, and the appearances after the salt spray test and the wetting test were evaluated, and were taken as the evaluation of the corrosion resistance performance. The results are shown in Table 5 and Table 6.

[High Temperature High Humidity Acceleration Test (High Acceleration Life Test, PCT Test (Pressure Cooker Test)]

Further, for Examples 12 to 22, and Comparative Examples 9 to 12, using a high acceleration life test apparatus [EHS-411(M) manufactured by ESPEC Co.], a PCT test ranked as a high temperature high humidity acceleration test was conducted under the conditions of 95% RH, at 150° C., and for 5 hours, thereby evaluating the tensile shear strength after the high temperature high humidity test. Further, for the coated surface except for the junction part, the adhesion (cross-cut adhesion) was evaluated by the method (cross-cut method) of the adhesion evaluation of JIS K 5600. Further, the appearance was evaluated, and was taken as the evaluation of the corrosion resistance performance.

<Corrosion Resistance Evaluation of Coating Film>

With the salt spray test, the coated surface except for the junction part of each specimen (N=3) of the joining aluminum specimens and adhesion specimens obtained in respective Examples and Comparative Examples was cross-cut, and a 500-hour test was carried out. With the salt spray test, evaluation was performed with the evaluation criteria of ⊚: corrosion, swelling, and the like are not caused at the cut part at all, and the adhesion of the cut part was good, ○: the corrosion of the cut part is equal to or smaller than 1 mm in size, and swelling was not caused, and the adhesion was good, and X: the corrosion of the cut part was 1 mm or more in size, or abnormal condition such as occurrence of swelling or poor adhesion was caused, in the coating film after 500 hours. The results are shown in Table 5 and Table 6.

With the wetting test, there was evaluated the adhesion of the coated surface except for the junction part of each specimen (N=3) of the joining aluminum specimens and adhesion specimens obtained in respective Examples and Comparative Examples. The adhesion of the coating film was evaluated by rating the case where the area of the cross cut part which had undergone peeling was 5% or less (classification 1 or less) as ⊚; the case of more than 5% and 15% or less as ○, the case of more than 15% and 35% or less as Δ; and the case of more than 35% as X with the method of adhesion (cross-cut method) of JIS K 5600. The results are shown in Table 5 and Table 6.

TABLE 5

| | | Examples 1-11 and Comparative Examples 1-8 | | | | | | | | | |
|---|---|---|---|---|---|---|---|---|---|---|---|
| | | Example | | | | | | | | | |
| | | 1 | 2 | 3 | 4 | 5 | 6 | 7 | 8 | 9 | 10 |
| Layer configuration | Coating film layer | A | B | — | — | — | — | — | — | — | — |
| | Adhesion layer | C | D | C | C | D | E | E | F | — | — |
| Film thickness (μm) | Coating film layer | 5 | 10 | — | — | — | — | — | — | — | — |
| | Adhesion layer | 25 | 5 | 15 | 40 | 20 | 35 | 20 | 35 | — | — |
| | Total film thickness | 30 | 15 | 15 | 40 | 20 | 35 | 20 | 35 | — | — |

TABLE 5-continued

Examples 1-11 and Comparative Examples 1-8

| | | | | | | | | | | | |
|---|---|---|---|---|---|---|---|---|---|---|---|
| Composition of silica containing film | Film mass (mg/m$^2$) | 112.1 | 88.9 | 10.6 | 56.75 | 22.4 | 60.4 | 32.7 | 64.4 | 60.4 | 65.4 |
| | Si content (mg/m$^2$) | 44.9 | 36.1 | 4.26 | 22.1 | 8.53 | 22.7 | 14.14 | 23.3 | 22.7 | 28.29 |
| | P content (mg/m$^2$) | 4.84 | 2.01 | 0.35 | 1.34 | 1.07 | 1.07 | 0.54 | 1.07 | 1.07 | 1.07 |
| | P/Si mass ratio | 0.108 | 0.056 | 0.082 | 0.061 | 0.125 | 0.047 | 0.038 | 0.046 | 0.047 | 0.038 |
| | Si content ratio (mass %) | 40.04 | 40.58 | 40.20 | 38.89 | 38.06 | 37.60 | 43.25 | 36.15 | 37.60 | 43.25 |
| | P content ratio (mass %) | 4.31 | 2.27 | 3.29 | 2.37 | 4.80 | 1.78 | 1.64 | 1.66 | 1.78 | 1.64 |
| | Silane coupling agent content ratio (mass %) | 0.71 | 8.43 | 4.71 | 13.21 | 4.46 | 19.87 | 3.06 | 24.84 | 19.87 | 3.06 |
| Evaluation of adhesion strength with resin | Tensile shear strength (MPa) | 13.7 | 13.2 | 14.4 | 15.2 | 14.7 | 11.2 | 10.7 | 25.4 | 7.8 | — |
| | Tensile shear strength after wetting test (MPa) | 12.5 | 12.8 | 14.2 | 14.8 | 13.5 | 10.8 | 10.5 | 24.5 | 7.8 | — |
| | Tensile shear strength after SST 500 hrs (MPa) | 12.2 | 12.5 | 13.6 | 14.7 | 13.6 | 10.5 | 10.4 | 24.2 | 7.4 | — |
| Evaluation of corrosion resistance except for junction part | Appearance after SST 500 hrs | ○ | ◎ | ◎ | ◎ | ◎ | ◎ | ◎ | ◎ | ◎ | Δ |
| | Cross-cut adhesion after wetting test 500 hrs | ◎ | ◎ | ◎ | ◎ | ◎ | ◎ | ◎ | ◎ | ◎ | — |
| Comprehensive evaluation | | ○ | ◎ | ◎ | ◎ | ◎ | ◎ | ◎ | ◎ | ◎ | ○ |

| | | Example | Comparative Example | | | | | | | |
|---|---|---|---|---|---|---|---|---|---|---|
| | | 11 | 1 | 2 | 3 | 4 | 5 | 6 | 7 | 8 |
| Layer configuration | Coating film layer | — | — | — | A | B | — | B | — | — |
| | Adhesion layer | — | C | D | C | D | E | E | C | E |
| Film thickness (μm) | Coating film layer | — | — | — | 5 | 5 | — | 5 | — | — |
| | Adhesion layer | — | 20 | 2 | 30 | 30 | 20 | 30 | 40 | 20 |
| | Total film thickness | — | 20 | 2 | 35 | 35 | 20 | 35 | 40 | 20 |
| Composition of silica containing film | Film mass (mg/m$^2$) | 148.5 | 4.85 | 64.5 | 11.35 | 105.6 | 211.1 | 23.3 | 26.83 | 465 |
| | Si content (mg/m$^2$) | 49.1 | 1.87 | 15.28 | 4.9 | 47.1 | 94.2 | 8.53 | 11.2 | 106 |
| | P content (mg/m$^2$) | 2.68 | 0.27 | 8.06 | 0.27 | 0.81 | 1.61 | 1.34 | 0.81 | 0 |
| | P/Si mass ratio | 0.055 | 0.144 | 0.527 | 0.055 | 0.017 | 0.017 | 0.157 | 0.072 | 0.000 |
| | Si content ratio (mass %) | 33.08 | 38.48 | 23.69 | 43.17 | 44.62 | 44.62 | 36.67 | 41.74 | 22.79 |
| | P content ratio (mass %) | 1.81 | 5.54 | 12.49 | 2.37 | 0.76 | 0.76 | 5.78 | 3.00 | 0.00 |
| | Silane coupling agent content ratio (mass %) | 33.67 | 0.00 | 13.95 | 0.00 | 2.84 | 2.84 | 4.30 | 0.00 | 21.51 |
| Evaluation of adhesion strength with resin | Tensile shear strength (MPa) | — | 13.5 | 2.1 | 13.9 | 14.2 | 11.4 | 11.8 | 1.2 | 10.5 |
| | Tensile shear strength after wetting test (MPa) | — | 0 | 0 | 0 | 0 | 0 | 0 | 0 | 5.2 |
| | Tensile shear strength after SST 500 hrs (MPa) | — | 0 | 0 | 0 | 0 | 0 | 0 | 0 | 0 |

TABLE 5-continued

Examples 1-11 and Comparative Examples 1-8

| Evaluation of corrosion resistance except for junction part | Appearance after SST 500 hrs | ◎ | ○ | Δ | ○ | X | X | ○ | ○ | X |
|---|---|---|---|---|---|---|---|---|---|---|
| | Cross-cut adhesion after wetting test 500 hrs | — | Δ | X | X | X | X | X | X | ○ |
| Comprehensive evaluation | | ◎ | X | X | X | X | X | X | X | X |

TABLE 6

Examples 12-22 and Comparative Examples 9-12

| | | Example | | | | | | | |
|---|---|---|---|---|---|---|---|---|---|
| | | 12 | 13 | 14 | 15 | 16 | 17 | 18 | 19 |
| Layer configuration | Coating film layer | A | B | — | — | — | G | — | — |
| | Adhesion layer | C | D | C | D | C | E | E | F |
| Film thickness (μm) | Coating film layer | 10 | 10 | — | — | — | 10 | — | — |
| | Adhesion layer | 5 | 2 | 10 | 40 | 20 | 10 | 20 | 50 |
| | Total film thickness | 15 | 12 | 10 | 40 | 20 | 20 | 20 | 50 |
| Composition of silica containing film | Film mass(mg/m$^2$) | 112.1 | 88.9 | 10.6 | 56.75 | 21.21 | 60.4 | 32.7 | 64.4 |
| | Si content (mg/m$^2$) | 44.9 | 35.75 | 4.26 | 21.75 | 8.54 | 22.7 | 14.14 | 23.3 |
| | P content (mg/m$^2$) | 4.84 | 2.01 | 0.35 | 1.34 | 0.70 | 1.07 | 0.54 | 1.07 |
| | P/Si mass ratio | 0.108 | 0.056 | 0.082 | 0.062 | 0.082 | 0.047 | 0.038 | 0.046 |
| | Si content ratio (mass %) | 40.04 | 40.23 | 40.20 | 38.33 | 40.28 | 37.60 | 44.25 | 36.15 |
| | P content ratio (mass %) | 4.31 | 2.27 | 3.29 | 2.37 | 3.29 | 1.78 | 1.64 | 1.66 |
| | Silane coupling agent content ratio (mass %) | 0.71 | 8.43 | 4.71 | 13.21 | 4.71 | 19.87 | 3.06 | 24.84 |
| Evaluation of adhesion strength with Resin | Tensile shear strength (MPa) | 13.5 | 13.0 | 13.8 | 15.4 | 14.5 | 11.5 | 11.2 | 25.1 |
| | Tensile shear strength (MPa) After wetting test | 13.0 | 12.5 | 13.5 | 14.9 | 13.8 | 11.2 | 10.9 | 24.3 |
| | After SST 500 hrs | 12.7 | 12.5 | 13.0 | 14.5 | 13.6 | 11.0 | 10.2 | 24.5 |
| | After PCT test 5 hrs | 12.0 | 12.5 | 0 | 10.5 | 3.5 | 11.0 | 3.8 | 24.3 |
| Evaluation of corrosion resistance except for junction part | Appearance after SST 500 hrs | ◎ | ◎ | ◎ | ◎ | ◎ | ◎ | ◎ | ◎ |
| | Cross-cut adhesion after wetting test 500 hrs | ◎ | ◎ | ◎ | ◎ | ◎ | ◎ | ◎ | ◎ |
| | Cross-cut adhesion after PCT test 5 hrs | ◎ | ◎ | X | ○ | Δ | ◎ | ○ | ◎ |
| Comprehensive evaluation | | ◎ | ◎ | Δ | ○ | ○ | ◎ | ○ | ◎ |

| | | Example | | | Comparative Example | | | |
|---|---|---|---|---|---|---|---|---|
| | | 20 | 21 | 22 | 9 | 10 | 11 | 12 |
| Layer configuration | Coating film layer | — | G | G | — | — | G | Si-E |
| | Adhesion layer | C | C | C | E | C | C | E |
| Film thickness (μm) | Coating film layer | — | 4 | 9 | — | — | 2 | 10 |
| | Adhesion layer | 5 | 1 | 1 | 40 | 4 | 2 | 10 |
| | Total film thickness | 5 | 5 | 10 | 40 | 4 | 4 | 20 |
| Composition of silica containing film | Film mass(mg/m$^2$) | 21.21 | 21.21 | 21.21 | 465 | 21.21 | 21.21 | 465 |
| | Si content (mg/m$^2$) | 8.54 | 8.54 | 8.54 | 106 | 8.54 | 8.54 | 106 |
| | P content (mg/m$^2$) | 0.70 | 0.70 | 0.70 | 0 | 0.70 | 0.70 | 0 |
| | P/Si mass ratio | 0.082 | 0.082 | 0.082 | 0.000 | 0.082 | 0.082 | 0.000 |
| | Si content ratio (mass %) | 40.28 | 40.28 | 40.28 | 22.79 | 40.28 | 40.28 | 22.79 |
| | P content ratio (mass %) | 3.29 | 3.29 | 3.29 | 0.00 | 3.29 | 3.29 | 0.00 |
| | Silane coupling agent content ratio (mass %) | 4.71 | 4.71 | 4.71 | 21.51 | 4.71 | 4.71 | 21.51 |
| Evaluation of adhesion strength with Resin | Tensile shear strength (MPa) | 13.8 | 12.8 | 13.5 | 10.9 | 9.5 | 7.3 | 9.8 |
| | Tensile shear strength (MPa) After wetting test | 12.1 | 11.5 | 12.6 | 6.0 | 9.1 | 6.2 | 8.7 |
| | After SST 500 hrs | 11.9 | 11.3 | 12.8 | 0 | 9.2 | 4.5 | 9.4 |
| | After PCT test 5 hrs | 0 | 11.2 | 12.3 | 0 | 0 | 0 | 0 |
| Evaluation of corrosion | Appearance after SST 500 hrs | ◎ | ◎ | ◎ | X | Δ | Δ | Δ |

TABLE 6-continued

Examples 12-22 and Comparative Examples 9-12

| resistance except for junction part | Cross-cut adhesion after wetting test 500 hrs | ⊚ | ⊚ | ⊚ | ○ | ○ | ○ | ○ |
|---|---|---|---|---|---|---|---|---|
| | Cross-cut adhesion after PCT test 5 hrs | X | ⊚ | ⊚ | X | X | X | X |
| | Comprehensive evaluation | Δ | ⊚ | ⊚ | X | X | X | X |

REFERENCE SIGNS LIST

1: Resin part (resin molded body)
2: coated aluminum material for joining
3: Junction part
4: Jig
5: Load
6: Support body
6a: Grab area
7: Junction part
7a: Junction area

The invention claimed is:

1. A coated aluminum material comprising:
an aluminum material consisting of aluminum or an aluminum alloy, and a silica-containing film, as a joining undercoat film, formed on a surface of the aluminum material, the silica-containing film being obtained by drying and curing a film-forming treatment solution consisting of colloidal silica, phosphoric acid, a silane coupling agent, and water or alcohol, wherein
an average particle size of the colloidal silica is 10 to 300 nm,
the silane coupling agent has a reactive functional group selected from the group consisting of epoxy group, thiol group and amino group, and
the silica-containing film has a thickness of 10.6-148.5 mg/m$^2$, includes the silane coupling agent in a ratio of 0.5 to 35 masse, and has a Si atom content falling within the range of 4.26 to 49.1 mg/m$^2$, a P atom content falling within the range of 0.35 to 4.84 mg/m$^2$, and a mass ratio (P/Si mass ratio) of the P atom content to the Si atom content falling within the range of 0.038-0.125.

2. A coated aluminum material for joining comprising:
an aluminum material consisting of aluminum or an aluminum alloy, and an adhesion layer formed on a surface of the aluminum material with a silica-containing film provided between the aluminum material and the adhesion layer, the silica-containing film being obtained by drying and curing a film-forming treatment solution consisting of colloidal silica, phosphoric acid, a silane coupling agent, and water or alcohol, wherein
an average particle size of the colloidal silica is 10 to 300 nm,
the silane coupling agent has a reactive functional group selected from the group consisting of epoxy group, thiol group and amino group, and
the silica-containing film has a thickness of 10.6-148.5 mg/m$^2$, includes the silane coupling agent in a ratio of 0.5 to 35 mass %, and has a Si atom content falling within the range of 4.26 to 49.1 mg/m$^2$, a P atom content falling within the range of 0.35 to 4.84 mg/m$^2$, and a mass ratio (P/Si mass ratio) of the P atom content to the Si atom content falling within the range of 0.038-0.125.

3. The coated aluminum material for joining according to claim 2, wherein
the adhesion layer is a coating film made of a thermoplastic resin having a reactive functional group.

4. The coated aluminum material for joining according to claim 3, wherein
the thermoplastic resin is selected from an acid modified polyolefin type resin and an acid modified chlorinated polyolefin type resin.

5. The coated aluminum material for joining according to claim 2, wherein
the adhesion layer is a coating film made of a thermosetting resin.

6. The coated aluminum material for joining according to claim 5, wherein
the thermosetting resin includes an epoxy resin adhesive.

7. The coated aluminum material for joining according to claim 2, wherein
a coating film layer is formed between the silica-containing film and the adhesion layer.

8. The coated aluminum material for joining according to claim 7, wherein
the coating film layer includes a thermosetting resin.

9. The coated aluminum material for joining according to claim 7, wherein
the total film thickness of the sum of the film thickness of the adhesion layer and the film thickness of the coating film layer is 5 μm or more and 200 μm or less.

10. The coated aluminum material for joining according to claim 2, wherein
the coated aluminum material for joining is a precoated material before machining.

11. An aluminum resin composite material, comprising:
the coated aluminum material for joining according to claim 2; and
a resin molded body joined to the adhesion layer of the coated aluminum material for joining.

12. The aluminum resin composite material according to claim 11,
wherein the coated aluminum material for joining and the resin molded body are joined with each other by injection molding, coextrusion molding, or thermocompression to produce a metal-resin integrally molded product.

13. The aluminum resin composite material according to claim 11, wherein
the coated aluminum material for joining is a precoated material having adhesion layers on two surfaces thereof, respectively, and the resin molded body is joined to the adhesion layer on any one surface of the two surfaces.

14. The aluminum resin composite material according to claim 11, wherein
the coated aluminum material for joining is a precoated material having the adhesion layer on one surface thereof and having a coating film layer on the other surface.

* * * * *